United States Patent [19]
Akami et al.

[11] Patent Number: 5,946,507
[45] Date of Patent: Aug. 31, 1999

[54] LIQUID-CRYSTAL DISPLAY UNIT FOR CAMERA

[75] Inventors: Toru Akami; Minoru Hara, both of Hachioji; Takashi Suzuki, Hino; Motoko Tsutsumi, Hachioji, all of Japan

[73] Assignee: Olympus Optical Co., Ltd., Tokyo, Japan

[21] Appl. No.: 08/915,376

[22] Filed: Aug. 20, 1997

Related U.S. Application Data

[62] Division of application No. 08/599,938, Feb. 14, 1996, abandoned.

[30] Foreign Application Priority Data

Feb. 15, 1995 [JP] Japan .................................. H7-026930
Feb. 21, 1995 [JP] Japan .................................. H7-032695

[51] Int. Cl.⁶ ................................................. G03B 15/03
[52] U.S. Cl. ........................................ 396/287; 396/281
[58] Field of Search ..................................... 396/267, 287, 396/281; 345/87, 102; 368/242, 84

[56] References Cited

U.S. PATENT DOCUMENTS

4,221,112  9/1980  Enomoto et al. .......................... 368/84
4,893,140  1/1990  Yamamoto et al. ..................... 396/287

*Primary Examiner*—Safet Metjahic
*Assistant Examiner*—Michael Dalakis
*Attorney, Agent, or Firm*—Louise Weinstein

[57] ABSTRACT

The present invention relates to an LCD unit that has a reflective liquid-crystal panel including two glass plates with a liquid crystal locked in between, two polarization plates affixed to outer sides of the two glass plates, and a reflection plate arranged under the lower polarization plate. The LCD unit further comprises a light accumulating part that is arranged under the liquid-crystal panel in order to illuminate the liquid-crystal panel and that accumulates light and glows, and a light guide for efficiently introducing light entering externally to the light accumulating part.

11 Claims, 6 Drawing Sheets

LIQUID-CRYSTAL DISPLAY UNIT FOR CAMERA

This is a division of application Ser. No. 08/599,938, filed FEB. 14, 1996 now abandoned.

BACKGROUND OF THE INVENTION

1. Field of the Invention

The present invention relates to a liquid-crystal display unit for a camera, and more particularly, to a liquid-crystal display unit for a camera which has a reflective liquid-crystal panel.

2. Description of the Related Art

In recent years, for example, a liquid-crystal display unit having a liquid-crystal panel or the like has generally been used in practice as a display unit for displaying various information for a camera or the like designed for photography or the like.

A liquid crystal applicable to the liquid-crystal panel or the like does not glow by itself. For example, under a low-luminance environment such as at night or in a dark room, it becomes difficult to discern various information appearing on the liquid-crystal panel of the liquid-crystal display unit. In an effort to readily discern various information appearing on the liquid-crystal panel under a low-luminance environment, various proposals have been made for a liquid-crystal display unit in which a light-emitting device such as a light-emitting diode (hereinafter LED) is placed on the back side of a liquid-crystal panel or the like in order to illuminate the liquid-crystal panel or the like from the back side thereof. Such liquid-crystal display units have been put to practical use.

For example, a liquid-crystal display unit (LCD illuminating device for a camera) disclosed in Japanese Patent Laid-Open No. 2-53040 is such that a translucent liquid-crystal panel of a liquid-crystal display (hereinafter LCD) placed in a housing of a camera is illuminated from the back side thereof using a lighting device. The brightness of the back side of the liquid-crystal panel is measured. If a measured value is lower than a given value, the illuminating device is lit.

Figure 10:
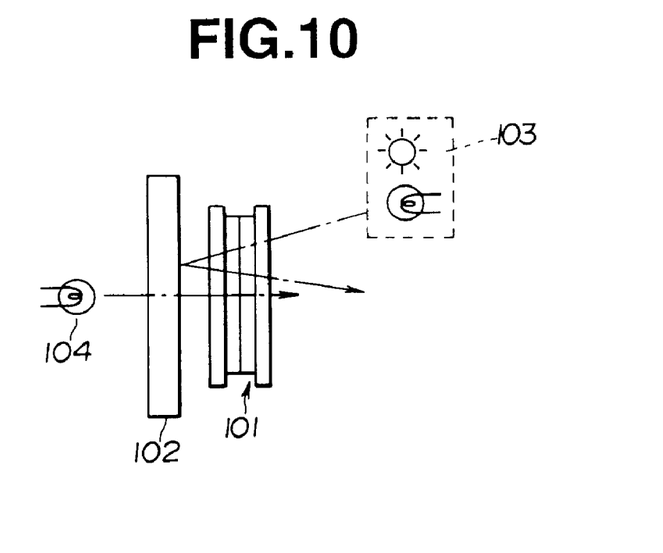
FIG. 10 is a diagram showing an outline structure of a known LCD unit having a reflective liquid-crystal panel.

The structure of the LCD unit having a liquid-crystal panel will be described briefly. As shown in FIG. 10, a translucent reflection plate 102 is placed behind a translucent liquid-crystal panel 101. An auxiliary light illuminating device 104, and a photometry means (not shown) for measuring the brightness on the back side of the liquid-crystal panel 101 are placed behind the translucent reflection plate 102.

External light 103 such as daylight or bright room light is measured by the photometry means. If the measured value sufficiently exceeds the given value, light originating from the external light 103 is transmitted by the liquid-crystal panel 101, and then reflected by the translucent reflection plate 102. The reflected light is irradiated from the back side of the liquid-crystal panel 101. Thus, the display of various information appearing on the liquid-crystal panel 101 can be discerned readily.

If the measured value of the external light 103 provided by the photometry means is lower than the given value, the auxiliary light illuminating device 104 placed behind the translucent reflection plate 102 is lit. The illumination light emanating from the auxiliary light illuminating device 104 is transmitted by the translucent reflection plate 102, and then irradiated from the back side of the liquid-crystal panel 101. Thus, the display of various information appearing on the liquid-crystal panel 101 can be readily discerned.

The liquid-crystal panel having the aforesaid structure shall be referred to as a reflective liquid-crystal panel.

Figure 11:
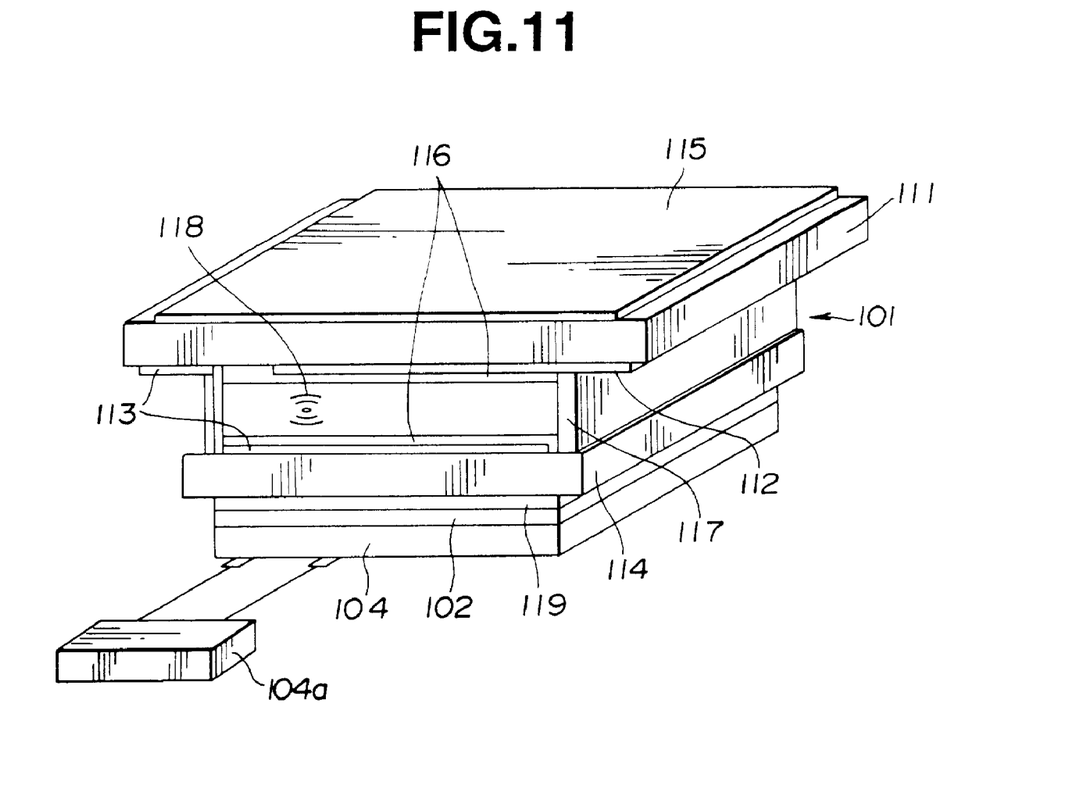
FIG. 11 is a perspective view showing the LCD unit shown in FIG. 10.

The structure of the LCD unit having the reflective liquid-crystal panel will be described in more detail. As shown in FIG. 11, the reflective liquid-crystal panel 101 comprises two glass plates arranged above and below with a liquid crystal locked in between them; that is, an upper glass plate 111 and lower glass plate 114, an upper polarization plate 115 affixed to the top of one of the two glass plates 111 and 114, a lower polarization plate 119 affixed to the bottom of the other glass plate, and a translucent reflection plate 102 arranged under the lower polarization plate 119.

The two glass plates of the upper glass plate 111 and lower glass plate 114 are opposed to each other. Segment electrodes 112 and common electrodes 113 are placed on the inner sides of the glass plates. A light distribution membrane 116 is placed on the inner sides of the segment electrodes and common electrodes. The segment electrodes 112 and common electrodes 113 are thus coated with the light distribution membranes 116 respectively. A liquid crystal 118 is locked in the innermost space.

A sealant 117 is interposed between the two glass plates; the upper glass plate 111 and lower glass plate 114. With the sealant 117, the lateral side of the liquid crystal 118 is sealed up.

The upper polarization plate 115 is placed on the top side of the upper glass plate 111. The lower polarization plate 119 is affixed to the bottom side of the lower glass plate 114.

In the reflective liquid-crystal panel 101 having the foregoing structure, the translucent reflection plate 102 and the LED 104 for backlighting that is an auxiliary light illuminating device are placed under the lower polarization plate 119. An LED drive circuit 104a is electrically connected to the backlighting LED 104.

In the liquid-crystal panel 101 of the LCD unit, for displaying given characters or graphic information, an LCD drive circuit (not shown) is used to apply a voltage between the segment electrodes 112 and common electrodes 113 so that the alignment of molecules of the liquid crystal 118 can be made different from the alignment occurring in an initial light distribution state. Transmission of incident light is thus controlled, whereby characters, graphic information, or the like can be contrasted to be discernible.

As mentioned above, in the LCD unit, the translucent reflection plate 102, placed on the back side of the liquid-crystal panel 101, backlighting LED 104 serving as an auxiliary light illuminating device, and LED drive circuit 104a for driving the LED are arranged as an illuminating means for illuminating the liquid-crystal panel 101 from the back side thereof.

When a camera or the like in which the LCD unit having the reflective liquid-crystal panel 101 is employed is used to perform photography or the like, if the discernible degree of various information on the liquid-crystal panel 101 deteriorates because photography is performed in a low-luminance environment such as at night or in a dark room, the LED drive circuit 104 is actuated in order to light the backlighting LED 104. Light emanating from the backlighting LED 104, as described in conjunction with FIG. 10, is transmitted by the translucent reflection plate 102 and illuminates the liquid-crystal panel 101 from the back side thereof.

For example, a light accumulator of a self-glowing type such as a luminous paint has generally been known in the past. When daylight or the like is irradiated to this type of light accumulator, light accumulation is effected (light is accumulated). The light accumulator then glows by itself in the low-luminance environment or the like.

The mechanism of the self-glowing is such that: when a light accumulator having a rare earth element or the like as a glowing source receives, for example, radiation or infrared rays, electrons are temporarily excited to enter a highly-energized state; and when the excited electrons return to the original state, light is emitted.

In recent years, various proposals have been made for an LCD unit in which an additive or the like is mixed in a light accumulator, measures are taken so that it will take much time for excited electrons to return to the original state, and thus the glowing time of the light accumulator is made longer.

However, according to a means disclosed in the Japanese Patent Laid-Open No. 2-53040, a power supply is needed for lighting the auxiliary light illuminating device 104. When the LCD unit concerned is employed in a camera or the like, it becomes necessary to take measures including a measure of supplying power required for lighting the auxiliary light illuminating device 104 from a camera body. The power consumption in the camera body therefore increases. A large battery must therefore be employed in a camera body. This poses problems that a camera becomes large in size and that a power saving is crippled.

Furthermore, there is a problem that since various relevant members including a drive circuit for driving a light-emitting device such as an LED, a judging means for judging whether or not to execute illumination, and a switching means needed for illumination become necessary, an LCD unit itself or a camera in which the LCD unit is employed becomes large in size and results in high costs.

OBJECTS AND SUMMARY OF THE INVENTION

A first object of the present invention is to provide an LCD unit for a camera which makes it possible to reduce power consumption.

A second object of the present invention is to provide an LCD unit for a camera which makes it possible to reduce power consumption and has a simple structure.

A third object of the present invention is to provide an LCD unit for a camera which makes it possible to reduce power consumption, has a simple structure, and is efficient.

A fourth object of the present invention is to provide an LCD unit for a camera which makes it possible to reduce power consumption, permits high-degree discernment even under a low-luminance environment, has a simple structure, and is efficient.

A fifth object of the present invention is to provide an LCD unit for a camera which can effectively utilize light emanating from a flashing device and makes it possible to reduce power consumption.

A sixth object of the present invention is to provide an LCD unit for a camera which can effectively introduce either external light of the camera or light emanating from a flashing device into a light accumulating member.

Briefly, the present invention is an LCD unit for a camera, comprising a reflective liquid-crystal panel and a light accumulating member placed on the back side of the liquid-crystal panel for illuminating the liquid-crystal panel from the back side thereof.

These as well as other objects and advantages of the present invention will become further apparent from the following detailed explanation.

DETAILED DESCRIPTION OF THE PREFERRED EMBODIMENTS

Referring to the drawings, embodiments of the present invention will be described below.

Figure 1:
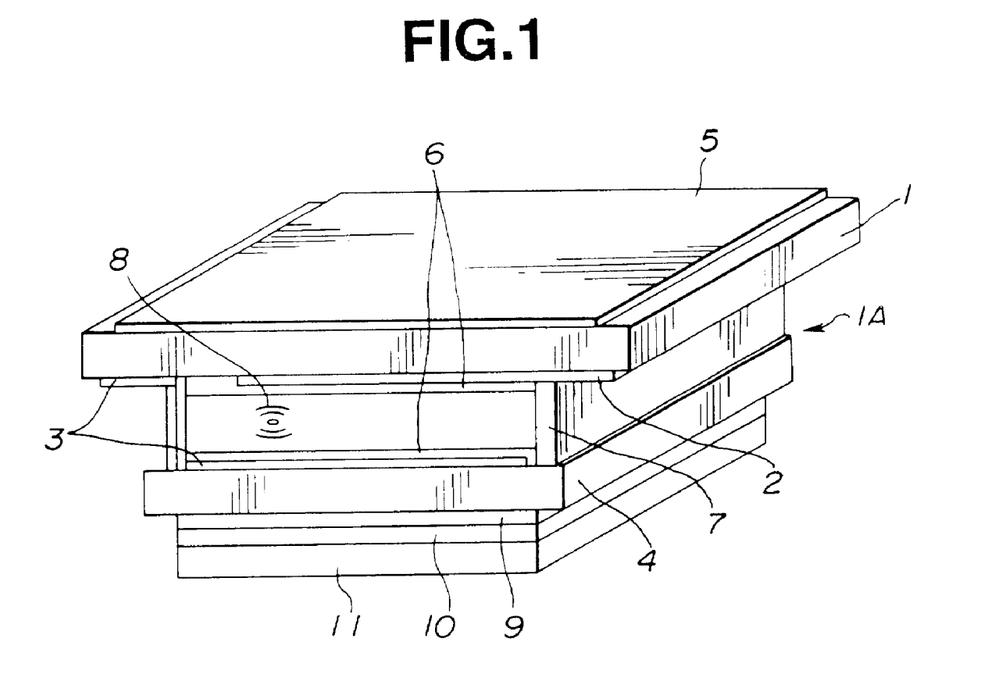
FIG. 1 is a perspective view showing an LCD unit of a first embodiment of the present invention.

FIG. 1 is a perspective view showing an LCD unit of the first embodiment of the present invention having a reflective liquid-crystal panel. The LCD unit of the first embodiment employs a light accumulating member on behalf of a light-emitting device such as an LED that serves as an illuminating means in a known LCD described in conjunction with FIG. 11.

As shown in FIG. 1, a reflective liquid-crystal panel 1A of the LCD unit of the first embodiment has two glass plates, i.e. an upper glass plate 1 and lower glass plate 4 opposed to each other. Segment electrodes 2 and common electrodes 3 are placed on the inner sides of the glass plates. A light distribution membrane 6 is placed on the inner sides of the segment electrodes 2 and common electrodes 3. The segment electrodes 2 and common electrodes 3 are thus coated with the respective light distribution membranes 6. A liquid crystal 8 is locked in the innermost space.

A sealant 7 is interposed between the two glasses; the upper glass plate 1 and lower glass plate 4, whereby the lateral side of the liquid crystal 8 is sealed up.

An upper polarization plate 5 is affixed to the top side of the upper glass plate 1, and a lower polarization plate 9 is affixed to the bottom side of the lower glass plate 4. A translucent reflection plate 10 is placed on the bottom side of the lower polarization plate 9. A light accumulating member 11 is placed on the bottom side of the translucent reflection plate 10.

Figure 2:
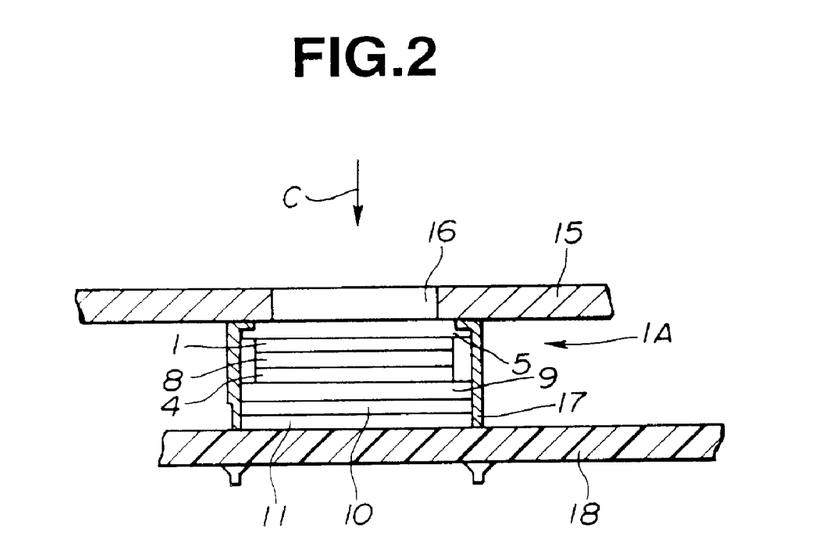
FIG. 2 is a sectional view showing a structure with an LCD unit mounted in a camera in the first embodiment.

FIG. 2 is a sectional view showing a structure with the LCD unit of the first embodiment mounted in a camera.

The reflective liquid-crystal panel 1A is secured to a substrate 18 placed inside a camera by means of a locking member 17. A display on the reflective liquid-crystal panel 1A can be observed through a display window 16 formed with an acrylic plate or the like and mounted in a camera housing member 15.

For displaying, for example, given character information or graphic information on the reflective liquid-crystal panel 1A of the LCD unit of the first embodiment having the foregoing structure, an LCD drive circuit (not shown) or the like is used to apply a voltage between the segment electrodes 2 and common electrodes 3 so that the alignment of molecules of the liquid crystal 8 will be made different from the alignment in an initial light distribution state. Transmission of incident light is thus controlled, whereby the character information, graphic information, or the like is contrasted to be discernible in a direction of an arrow C in FIG. 2.

Owing to the foregoing structure, in the LCD unit of the first embodiment, light transmitted by the liquid-crystal panel 1A is irradiated to and accumulated in the light accumulating member 11 placed under the translucent reflection plate 10 under a high-luminance environment such as during daytime or in a sufficiently bright room. Moreover, reflected light induced by the translucent reflection plate 10 is irradiated to the back side of the liquid-crystal panel 1A.

When the LCD unit of the first embodiment lies under a low-luminance environment such as at night or in a dark room, since the discernible degree of various information on the liquid-crystal panel 1A deteriorates, the light accumulating member 11, which is placed under the translucent reflection plate 10 and in which light is accumulated under the high-luminance environment, glows. Light emanating from the light accumulating member 11 is transmitted by the translucent reflection plate 10 and irradiated to the liquid-crystal panel 1A from the back side thereof.

As described above, according to the first embodiment, the self-glowing action of the light accumulating member 11 is utilized. Any particular power supply or the like is unnecessary, and an illuminating means need not be included. Despite its simple structure, the LCD unit makes it possible to readily discern various information or the like appearing on the liquid-crystal panel 1A even under the low-luminance environment, and the LCD unit itself can be designed compactly.

The LCD unit can contribute to a reduction in size of an apparatus employing the LCD unit, for example, a camera, and to a power saving in the apparatus.

Figure 3:
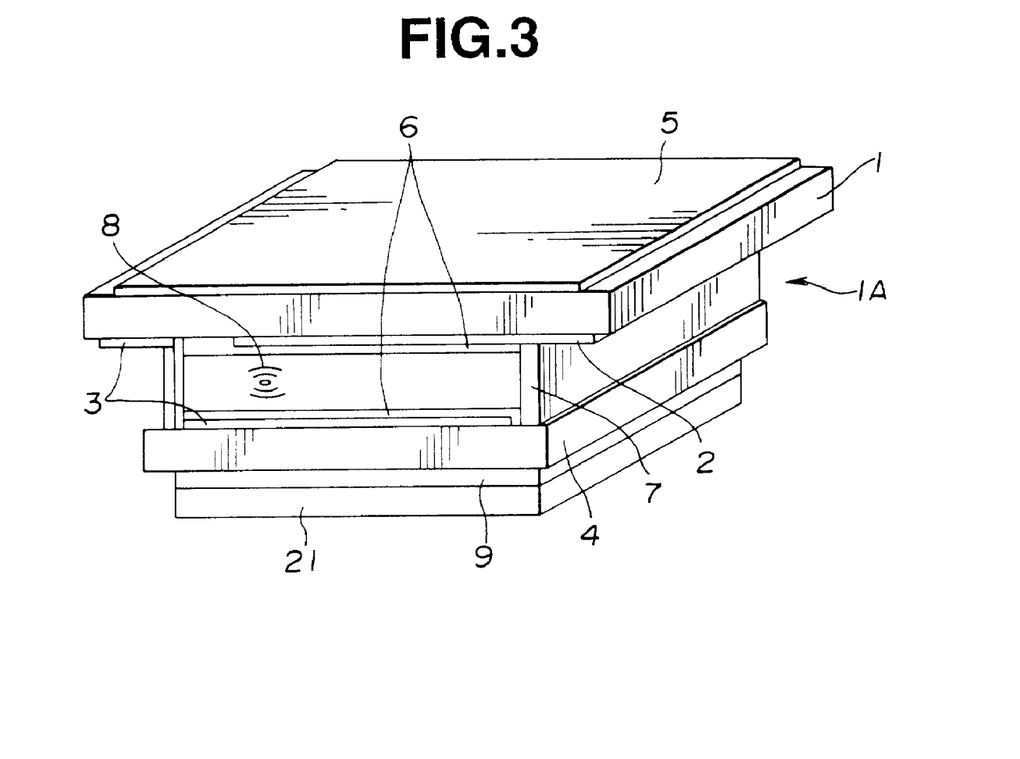
FIG. 3 is a perspective view showing an LCD unit of a second embodiment of the present invention.

FIG. 3 is a perspective view showing an LCD unit of the second embodiment of the present invention having a reflective liquid-crystal panel. The LCD unit of the second embodiment has basically the same structure as that of the first embodiment. A difference lies in that the translucent reflection plate 10 in the first embodiment is omitted and a light accumulating member 21 is included. The same members as those described in the first embodiment will be assigned the same reference numerals. A description of the like members will be omitted. Only different members will be described below.

As shown in FIG. 3, a light accumulating member 21 that is a sheet member having a light accumulator applied to the front side thereof, a plate-like member molded with a light accumulator contained therein, or the like is placed on the bottom side of the lower polarization plate 9 affixed under the liquid-crystal panel 1A. Herein, a light accumulator may be applied directly to the bottom side of the lower polarization plate 9. As mentioned above, the light accumulating member 21 is included as a substitute for the translucent reflection plate 10 in the first embodiment.

In the LCD unit of the second embodiment, similarly to the one of the first embodiment, under the high-luminance environment such as during daytime or in a sufficiently bright room, light transmitted by the liquid-crystal panel 1A is irradiated to and accumulated in the light accumulating member 21. In addition, light reflected by the light accumulating member 21 is irradiated to the back side of the liquid-crystal panel 1A.

When the LCD unit of the second embodiment lies under the low-luminance environment such as at night or in a dark room, since the discernible degree of various information on the liquid-crystal panel 1A deteriorates, the light accumulating member 21 glows. Light emanating from the light accumulating member 21 is then irradiated to the liquid-crystal panel 1A from the back side of the panel.

As described above, according to the second embodiment, the same advantage as that provided by the first embodiment is made available.

In the aforesaid first embodiment, since the translucent reflection plate 10 is interposed between the reflective liquid-crystal panel 1A and light accumulating member 11, a sufficient light accumulation effect may not be exerted under the high-luminance environment in relation to the light transmittancy of the translucent reflection plate 10. In the second embodiment, the translucent reflection plate 10 is omitted, and the light accumulating member 21 that is a sheet member having a light accumulator applied to the front side thereof, a plate-like member molded with a light accumulator contained therein, or the like is included and used also as a reflection plate. Consequently, light accumulation can be achieved more efficiently. Under either the high-luminance environment or low-luminance environment, the liquid-crystal panel 1A can be irradiated from the back side thereof more efficiently.

Figure 4:
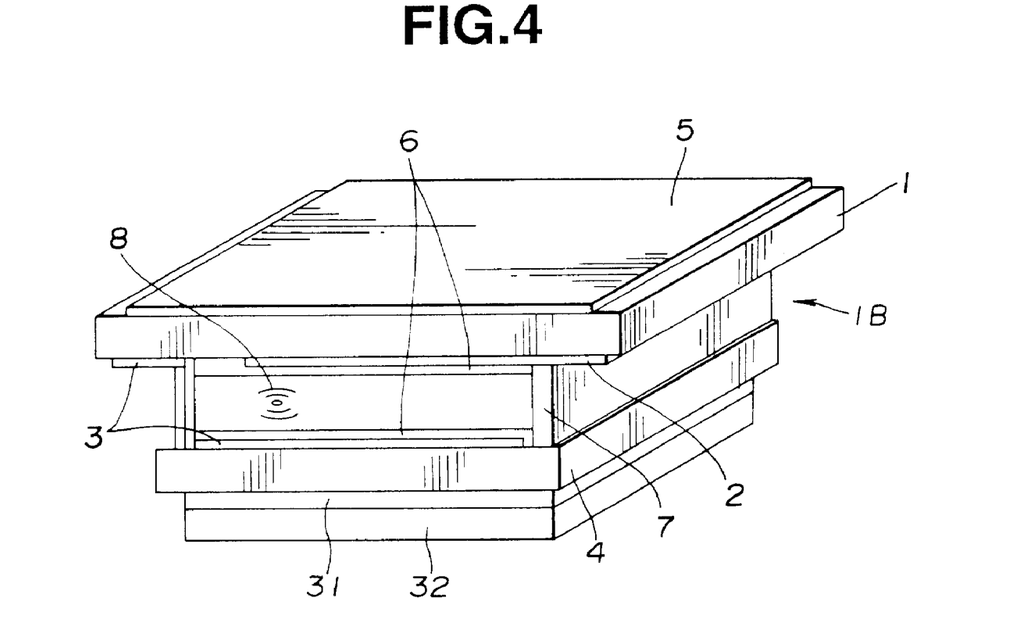
FIG. 4 is a perspective view showing an LCD unit of a third embodiment of the present invention.

FIG. 4 is a perspective view showing an LCD unit of the third embodiment of the present invention having a reflective liquid-crystal panel. Even the LCD unit of the third embodiment has basically the same structure as that of the first or second embodiment. Like members described in the first and second embodiments have been assigned the same reference numbers in FIG. 4. The description of like members will be omitted. Only different portions will be described below.

As shown in FIG. 4, in a reflective liquid-crystal panel 1B in the third embodiment, a lower polarization plate 31 affixed to the bottom side of the lower glass plate 4 is molded with, for example, a light accumulator contained therein. A reflection plate 32 that is an aluminum plate or a plate-like member having aluminum or the like vapor-deposited is placed on the bottom side of the lower polarization plate 31.

Owing to the foregoing structure, in the third embodiment, similar to the first and second embodiments, under the high-luminance environment, light accumulation is performed by the light accumulator contained in the lower polarization plate 31, and light transmitted by the lower polarization plate 31 is reflected by the reflection plate 32 and irradiated to the liquid-crystal panel 1B from the back side of the panel. Under the low-luminance environment, the liquid-crystal panel 1B is irradiated from the back side thereof owing to the light accumulator contained in the lower polarization plate 31.

As described above, according to the third embodiment, the advantage identical to that provided by the first and second embodiment is made available.

A light accumulator is contained in the lower polarization plate 31 itself, whereby light accumulation can be achieved more efficiently. Furthermore, irradiation of the liquid-crystal panel 1B from the back side thereof can be achieved more efficiently.

In the third embodiment, the lower glass plate 4 of the liquid-crystal panel 1B or the liquid crystal 8 serving as a liquid crystal member may be molded with the light accumulator contained therein. The same advantage can still be provided.

Figure 5:
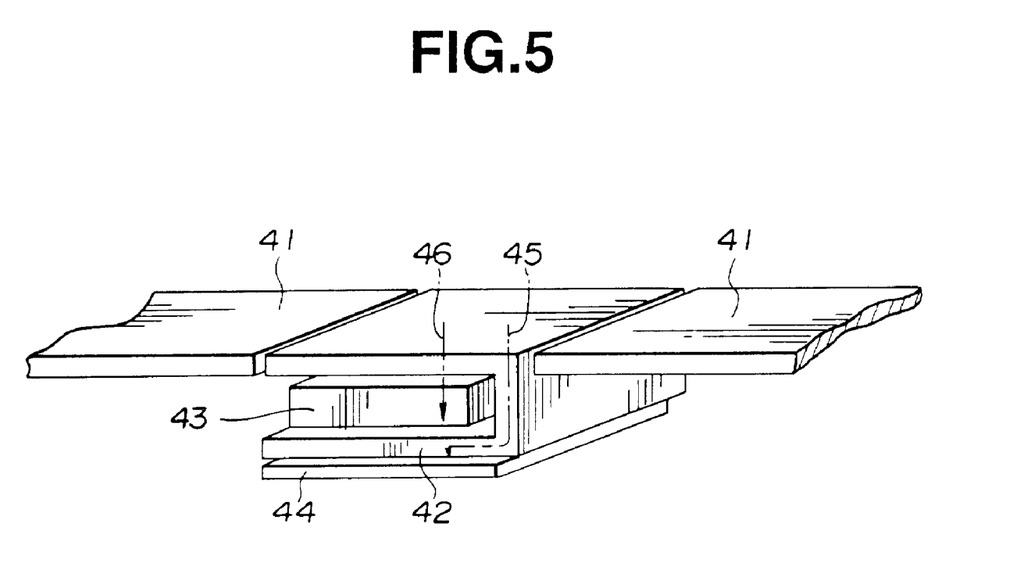
FIG. 5 is a perspective view schematically showing an LCD unit of a fourth embodiment of the present invention having a reflective liquid-crystal panel.

FIG. 5 is a perspective view schematically showing an LCD of the fourth embodiment of the present invention having a reflective liquid-crystal panel.

According to the structure of the first embodiment shown in FIG. 2, accumulation of light in the light accumulating member 11 is dependent exclusively on light transmitted by the reflective liquid-crystal panel 1A; that is, the display window 16, two polarization plates 5 and 9, translucent reflection plate 10, and two glass plates 1 and 4, and the liquid crystal 8 or the like locked in between the two glass plates 1 and 4. Depending on the light transmittancy of the liquid-crystal panel 1A, transmitted light may be insufficient. The light-accumulation efficiency relative to the light accumulator is therefore not always high enough. The LCD unit of the fourth embodiment is proposed in an effort to improve an LCD unit from this viewpoint.

The LCD unit of the fourth embodiment is designed, for example, to be mounted in a housing of a camera or any other apparatus and to display various information or the like concerning the apparatus.

As shown in FIG. 5, the LCD unit placed in a housing member 41 of a camera or any other apparatus has a light guide means 42 that is bent in the form of a square bracket, of which a left side is opened, surrounding a reflective liquid-crystal panel 43, for example, a transparent panel made of a transparent acrylic material. A light accumulating member 44 is brought into close contact with the bottom side of the light guide means 42.

The light accumulating member 44 is formed as a plate-like member containing a light accumulator (for example, luminous paint) that contains a rare earth element. In the light accumulator, when receiving radiation or infrared rays, electrons are excited to enter a highly-energized state. When returning to an original state, the excited electrons emit light.

The light accumulating member 44 reflects external light (indicated with an arrow 46 in FIG. 5) transmitted by the light guide means 42 and reflective liquid-crystal panel 43 or the like, and thus acts as a reflection plate for irradiating the reflective liquid-crystal panel 43 from the back side of the panel.

The light guide means 42 is placed so that the top thereof can serve as a display window for the liquid-crystal panel 43 so as to make it possible to readily discern a display of various information appearing on the display surface of the liquid-crystal panel 43. In addition, the lateral side of the light guide means 42 serves as a light guide member for introducing and irradiating external light (indicated with an arrow 45 in FIG. 5) into the light accumulating member 44 placed on the bottom side of the light accumulating means 42.

In the fourth embodiment, the light guide means 42 is described to be, for example, a transparent panel made of a transparent acrylic material or the like. As long as the light guide means 42 can effectively irradiate external light to the light accumulating member 44 placed on the bottom side of the liquid-crystal panel 43 and makes it possible to readily discern the display surface of the liquid-crystal panel 43, the light guide means 42 may be formed with any other member.

When the LCD unit of the fourth embodiment having the foregoing structure lies under the high-luminance environment, part of external light 45 irradiated from above the LCD unit is introduced and irradiated into the light accumulating member 44 via the light guide means 42. Part the external light 46 is transmitted by the display window of the light guide means 42, the liquid-crystal panel 43, and the like, and then irradiated to the light accumulating member 44 placed on the bottom side of the liquid-crystal panel 43. The light accumulating member 44 can therefore efficiently accumulate sufficient light. Part of the external light 46 is reflected by the light accumulating member 44, and then irradiated to the liquid-crystal panel 43 from the back side of the panel.

Under the low-luminance environment, the liquid-crystal panel 43 is irradiated by light emanating from the light accumulating member 44 from the back side thereof.

As described above, according to the fourth embodiment, light (external light 45) entering externally is introduced into the light accumulating member 44 by means of the light guide means 42. Despite being a simple mechanism, the light accumulating member 44 can efficiently accumulate light. Under either the low-luminance environment or high-luminance environment, the LCD unit makes it possible to readily discern the display of various information appearing on the display surface of the liquid-crystal panel 43.

Figure 6:
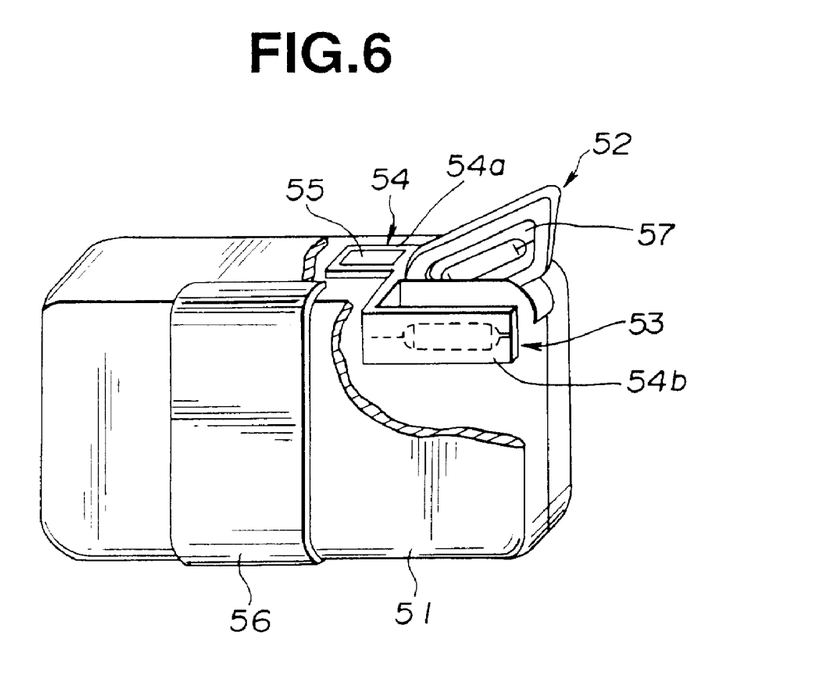
FIG. 6 is a perspective view schematically showing a camera in which an LCD unit of a fifth embodiment of the present invention having a reflective liquid-crystal panel is employed.

FIG. 6 is a perspective view schematically showing a camera in which an LCD unit of the fifth embodiment of the present invention having a reflective liquid-crystal panel is employed.

As shown in FIG. 6, the camera in the fifth embodiment is a so-called camera with a built-in flashing device in which a flashing device (strobe) 57 is incorporated in a camera body 51.

The strobe 57 is mounted so that it can pop up from the top side of the camera body 51 between a strobe pop-up position 52 leading to a pop-up state in which the strobe 57 pops up from the camera body 51 and a strobe stowage position 53 leading to a stowage state in which the strobe 57 is stowed in the camera body 51.

When photography is not performed (non-photography state), a barrier 56, which is placed on the front side of the camera body 51 so that the barrier 56 can slide freely, can be moved to a first position at which the barrier 56 covers the front side of a photographic lens barrel so as to shield relevant members or the like during photography, and to a second position at which the barrier 56 does not cover the front side of the photographic lens barrel.

On the top side of the camera body 51, an LCD unit 55 comprising a light accumulating member, reflective liquid-crystal panel, light guide means 54, and the like is mounted with a display window 54a oriented upward. The LCD unit 55 is substantially the same LCD unit as the one described in the fourth embodiment. The detailed description of the structure of the LCD unit will therefore be omitted. FIG. 5 will be used for reference.

The light guide means 54 in the fifth embodiment is, similar to the light guide means 42 in the fourth embodiment, for example, a transparent panel made of a transparent acrylic material or the like. The shape of the light guide means 54 is different from that in the fourth embodiment. The display window 54a of the LCD unit 55 is placed along the top of the camera body 51, and a light guide 54b placed on the lateral side of the display window 54 and shaped like a letter L are united with each other.

When the strobe 57 is located at the stowage position 53, the light guide 54b is at a position at which the light guide 54b shields the front side of the strobe 57; that is, the flashing side thereof. The light guide 54b thus introduces and irradiates flashlight emanating from the strobe 57 into the light accumulating member of the LCD unit 55.

The operations of the camera which is structured as mentioned above and in which the LCD unit 55 having a reflective liquid-crystal panel is employed will be described below.

Figure 7:
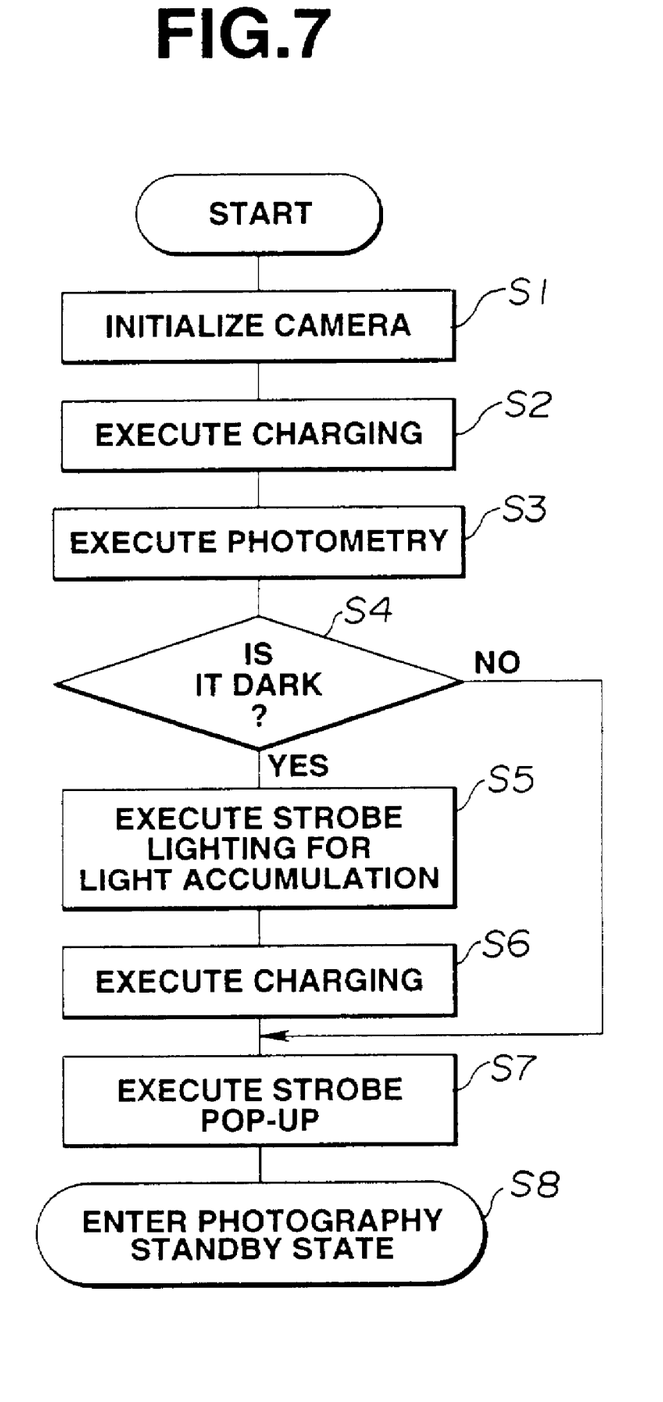
FIG. 7 is a flowchart describing the operations of the camera shown in FIG. 6.

FIG. 7 is a flowchart describing the operations of the camera in the fifth embodiment.

First, prior to photography, the barrier 56 placed on the front side of the camera body 51 is slided in an opening direction. Interlocked with the barrier 56, a main power switch (not shown) is turned on. At step S1, a camera sequence is initialized.

At step S2, a strobe charging circuit operates. Charging is thus started. At step S3, for photography, measurement of an exposure value relative to an object seen through a viewfinder is started; that is, photometry is started.

At step S4, based on a measured value resulting from photometry, it is judged whether or not the environment surrounding the camera is dark; that is, a luminance level is judged.

If "dark" is judged; that is, if it is judged that the camera lies under the low-luminance environment, control is passed to step S5. At step S5, a flashing means (not shown) in the strobe 57 performs flashing at the stowage position 53. Control is then passed to the next step S6. The strobe charging circuit starts charging. Control is then passed to the next step S7.

Flashlight resulting from flashing performed by the strobe 57 is introduced into the light accumulating member of the LCD unit 55 via the light guide 54b of the light guide means 54. Light is then accumulated in the light accumulating member of the LCD unit 55.

If "dark" is not judged as a result of photometry performed at step S4; that is, if it is judged that the camera lies under the high-luminance environment, control is passed to step S7.

At step S7, the strobe 57 pops up to the strobe pop-up position (strobe pop-up) so as to enable photography. At step S8, the camera enters a photography standby state. The sequence is terminated.

As described above, in the fifth embodiment, if it is judged on the basis of a measured value resulting from photometry performed prior to photography that the camera lies under the low-luminance environment, the strobe 57 serving as a flashing device and being incorporated in the camera body 51 is flashed. The flashlight is irradiated to the light accumulating member of the LCD unit 55 via the light guide means 54, and thus accumulated in the light accumulating member. Even when the light accumulating member has not accumulated sufficient light, a display on the display surface of the LCD unit 55 can be discerned in a good state all the time.

Figure 8:
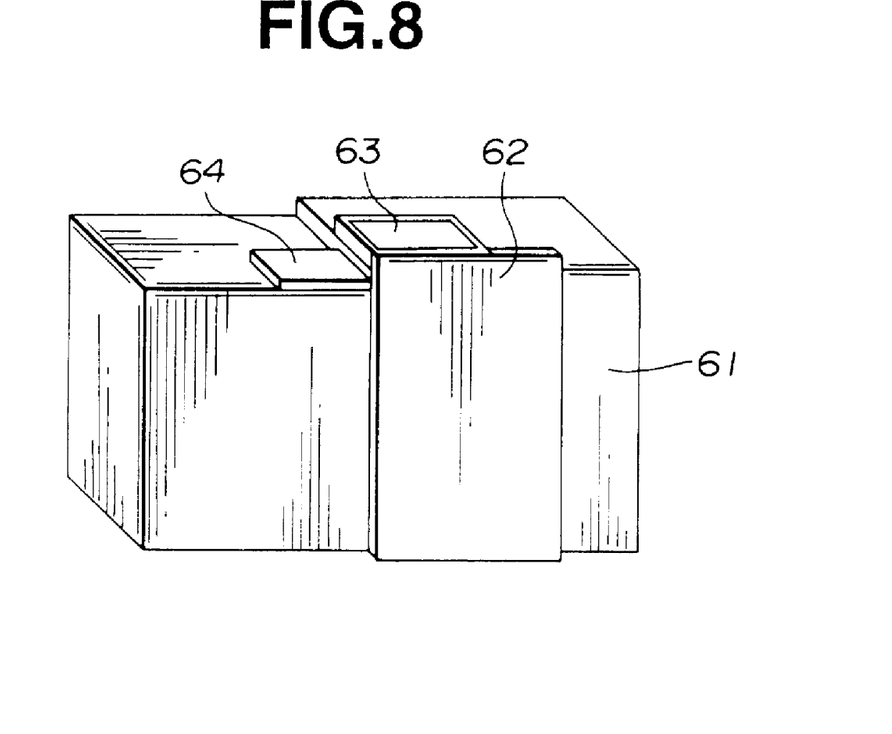
FIG. 8 is a perspective view schematically showing a camera in which an LCD unit of a sixth embodiment of the present invention having a reflective liquid-crystal panel is employed, wherein a barrier in the camera is in a closed state (second state)
Figure 9:
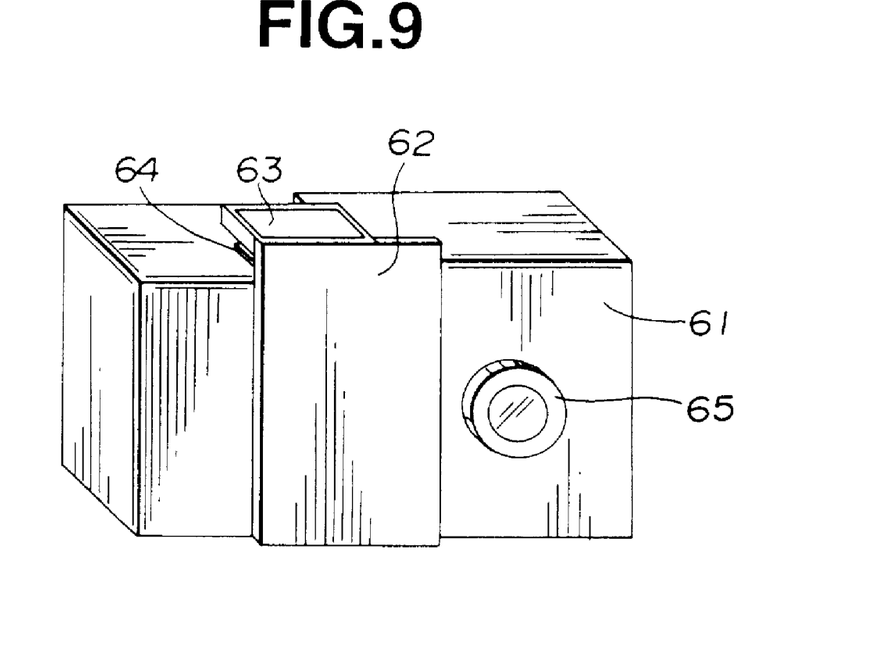
FIG. 9 is a perspective view schematically showing the camera in which an LCD unit of the sixth embodiment of the present invention having a reflective liquid-crystal panel is employed, wherein the barrier in the camera is in an open state (first state)

FIGS. 8 and 9 are perspective views schematically showing a camera in which an LCD unit of the sixth embodiment of the present invention having a reflective liquid-crystal panel is employed. FIG. 8 shows a barrier of the camera in a closed state (second state). FIG. 9 shows the barrier of the camera in an open state (first state).

In the camera in the sixth embodiment, when photography is not performed (non-photography state), as shown in FIG. 8, a barrier 62, which is placed on the front side of a camera body 61 so that the barrier 62 can slide freely, enters a closed state in which the barrier 62 shields and protects photography-related members such as a photographic lens 65. When photography is performed, as shown in FIG. 9, the barrier 62 is moved to enter an open state in which the barrier 62 uncovers the photography-related members such as the photographic lens 65.

A liquid-crystal panel 63 for displaying various information such as a photography mode of the camera is united with the top end of the barrier 62 so that the liquid-crystal panel 63 will lie along the top of the camera body 61. The liquid-crystal panel 63 moves along with the sliding of the barrier 62 between the closed state shown in FIG. 8 and the open state shown in FIG. 9. The barrier 62 is a moving means enabling the liquid-crystal panel 63 to move.

A light accumulating member 64 is placed on the top side of the camera body 61. With a movement of the barrier 62, if the liquid-crystal panel 63 enters the state shown in FIG. 9; that is, the open state, the light accumulating member 64 is located on the back side of the liquid-crystal panel 63. If the barrier 62 enters the state shown in FIG. 8; that is, the closed state, the liquid-crystal panel 63 is separated from the light accumulating member 64.

Herein, the open state of the barrier 62 that is the state shown in FIG. 9 shall be regarded as a first state. The closed state of the barrier 62 that is the state shown in FIG. 8 shall be regarded as a second state.

In the sixth embodiment, the liquid-crystal panel 63 is placed so that it can be moved by means of the barrier 62 serving as a moving means. The liquid-crystal panel 63 may be fixed to the camera body 61, while the light accumulating member 64 may be movable. That is to say, either one of the liquid-crystal panel 63 and light accumulating member 64 should be arranged to be movable relative to the other one fixed to the camera body 61.

In the camera of the sixth embodiment having the foregoing structure, when photography is not performed (non-photography state), normally, the barrier 62 is in the closed state that is the second state. In this state, the light accumulating member 64 is exposed to external light, sufficient light is accumulated.

Prior to photography, if the barrier 62 on the front side of the camera body 61 is moved to enter the open state that is the first state, the liquid-crystal panel 63 moves along with the movement of the barrier 62. The light accumulating member 64 is then positioned on the back side of the liquid-crystal panel 63.

In this state, under the high-luminous environment, light transmitted by the liquid-crystal panel 63 is reflected by the light accumulating member 64 serving also as a reflection panel, and irradiated to the liquid-crystal panel 63 from the back side of the panel. By contrast, under the low-luminous environment, as mentioned above, the light accumulating member 64, which has accumulated sufficient light when the barrier 62 is in the second state, irradiates the liquid-crystal panel 63 from the back side of the panel.

As described above, according to the sixth embodiment, the liquid-crystal panel 63 is arranged so that it can be interlocked with the barrier 62 serving as a moving means. In the second state (closed state of the barrier 62 shown in FIG. 8) in which the liquid-crystal panel 63 and light accumulating member 64 are separated from each other, the light accumulating means 64 is uncovered so that sufficient light can be accumulated therein. In the first state (open state of the barrier 62 shown in FIG. 9) in which the light accumulating member 64 is positioned on the back side of the liquid-crystal panel 63, the light accumulating member 64 irradiates the liquid-crystal panel 63 from the back side of the panel. This results in a reflective liquid-crystal panel that obviates the necessity of a power supply and permits high-degree discernment.

When a camera is carried with somebody, stored, or the like, a camera case (not shown) for protecting the whole camera body 61 is generally used to cover the camera. In this case, a window hole is formed at a position in the camera case coincident with the light accumulating member 64 so that external light can sufficiently be irradiated to the light accumulating member 64. Thus, even when the camera case is used to carry or store the camera, the light accumulating member 64 can accumulate light efficiently.

In this invention, it is apparent that a wide range of different working modes can be formed on the basis of this invention without a departure from the spirit and scope of the invention. This invention is not restricted to any specific embodiment but is limited only by the appended claims.

What is claimed is:

1. A liquid-crystal display unit for a camera which has a reflective liquid-crystal panel, comprising:
   a light accumulating member arranged on a back side of said liquid-crystal panel for illuminating said liquid-crystal panel;
   a light guide means for introducing light entering externally into said light accumulating member; and
   including a flashing device having a pop-up position and a stored position, wherein said light entering externally is light emanating from said flashing device when in the stored position.

2. A liquid-crystal display unit for a camera having a flashing device, comprising:
   a liquid-crystal display panel;
   a light accumulating member placed on a back of said liquid-crystal panel so that light emanating from said light accumulating member can illuminate said liquid-crystal panel; and
   a light guide member for introducing light external to said camera into said light accumulating member and also introducing light emanating from said flashing device only when said flashing device is moved to a stored position.

3. A liquid-crystal display unit for a camera which has a reflective liquid-crystal panel, comprising:
   a light accumulating member arranged on a back of said liquid-crystal panel for illuminating said liquid-crystal panel;
   a flashing device movable between a use position and a stored position; and
   a means for introducing flashlight emanating from said flashing device into said light accumulating member when said flashing device is in the stored position.

4. A liquid-crystal display unit for a camera which has a reflective liquid-crystal panel, comprising:
   a light accumulating member for illuminating said liquid-crystal panel;
   a moving means enabling one of said liquid-crystal panel and said light accumulating member to move between a first state in which said light accumulating member is positioned on a back side of said liquid-crystal panel and a second state in which liquid-crystal panel and said light accumulating member are separated from each other; and
   a flashing device that is placed in a camera body so that said flashing device can move between a stowage state and a pop-up state, and that is flashed in said stowage state in which photography is not performed;
   said flashlight being introduced into said light accumulating member.

5. A liquid-crystal display unit for a camera which has a reflective liquid-crystal panel, comprising:
   a light accumulating member for illuminating said liquid-crystal panel; and
   a moving means enabling one of said liquid-crystal panel and said light accumulating member to move between a first state in which said light accumulating member is positioned on a back side of said liquid-crystal panel and a second state in which said liquid-crystal panel and said light accumulating member are separated from each other;
   in said first state, said light accumulating member illuminating said liquid-crystal panel; and
   in said second state, external light entering said light accumulating member and being accumulated therein.

6. A liquid-crystal display unit for a camera according to claim 5, wherein said moving means is designed so that said liquid-crystal panel can move relative to said light accumulating member.

7. A liquid-crystal display unit for a camera which has a reflective liquid-crystal panel, comprising:
   a barrier movable between a second state in which said barrier covers a front of a photographic lens barrel of said camera and a first state in which said barrier does not cover the front thereof;
   a liquid-crystal panel united with said barrier;
   a light accumulating member fixed to said camera for illuminating said liquid-crystal panel; and
   a moving means that in said first state, positions said light accumulating member on a back side of said liquid-crystal panel and enables said light accumulating member to illuminate said liquid-crystal panel, and that in said second state, separates said light accumulating member from said liquid-crystal panel and enables said light accumulating member to perform light accumulation using external light.

8. A liquid-crystal display unit for a camera, comprising:
   a liquid-crystal display means having a reflective liquid-crystal panel;
   an illuminating means including a light accumulating member for illuminating said display means; and
   a moving means enabling one of said liquid-crystal panel and said light accumulating means to move between a first state in which said illuminating means can illuminate said display means and a second state in which said light accumulating member is moved relative to said liquid-crystal panels enabling the light accumulating member to receive external light.

9. A liquid-crystal display unit for a camera having a flashing device, comprising:
   a liquid-crystal panel designed for display;
   a light accumulating member placed on a back of said liquid-crystal panel so that light emanating from said light accumulating member can illuminate said liquid-crystal panel;

a light guide member for introducing light external of said camera into said light accumulating member and also introducing light emanating from said flashing device;

a photometry means for measuring ambient light, said photometry means outputting a photometry signal concerning said ambient light;

an operating means placed in a camera body, said operating means starting operation of said camera; and a control means that, when said operating means starts, allows said photometry means to output said photometry signal, and judges on the basis of said signal whether or not ambient light is bright or dark, and that when judging that ambient light is dark, allows said flashing device to flash, to feed flashlight to said light guide member.

10. A liquid-crystal display unit having a flashing device, comprising:

a liquid-crystal display panel;

a light accumulating member placed on a back of said panel so that light emanating from said light accumulating member can illuminate said liquid-crystal panel;

said flashing device movable between a use state and a stored state;

a light guide member for introducing light emanating from said flashing device into said light accumulating member only when said flashing device is moved to said stored state;

photometry means; and control means responsive to detection of a dark condition by said photometry means for operating said flashing device in its stored state.

11. A liquid-crystal display unit for a camera according to claim 10 wherein said control means further includes means for charging said flashing device in readiness for a flash photography subsequent to operating said flashing device to provide light for said light accumulating member.

* * * * *